US012651700B2

(12) United States Patent
Oh et al.

(10) Patent No.: US 12,651,700 B2
(45) Date of Patent: Jun. 9, 2026

(54) CAPACITOR HAVING ELECTRODE STRUCTURE OF HIGH VOLTAGE RESISTANCE FOR ELECTRIC VEHICLES

(71) Applicant: SAMHWA CAPACITOR CO., LTD., Yongin-si (KR)

(72) Inventors: Young Joo Oh, Yongin-si (KR); Jung Rag Yoon, Yongin-si (KR)

(73) Assignee: SAMHWA CAPACITOR CO., LTD., Yongin-si (KR)

( * ) Notice: Subject to any disclaimer, the term of this patent is extended or adjusted under 35 U.S.C. 154(b) by 177 days.

(21) Appl. No.: 18/616,515

(22) Filed: Mar. 26, 2024

(65) Prior Publication Data

US 2024/0355542 A1 Oct. 24, 2024

(30) Foreign Application Priority Data

Apr. 19, 2023 (KR) ......................... 10-2023-0051279

(51) Int. Cl.
*H01G 4/32* (2006.01)
*H01G 4/005* (2006.01)
*H01G 4/18* (2006.01)

(52) U.S. Cl.
CPC ............... *H01G 4/005* (2013.01); *H01G 4/18* (2013.01); *H01G 4/32* (2013.01)

(58) Field of Classification Search
None
See application file for complete search history.

(56) References Cited

U.S. PATENT DOCUMENTS

| | | | | | |
|---|---|---|---|---|---|
| 3,312,774 | A | * | 4/1967 | Drinko | H01B 3/004 174/121 R |
| 4,001,657 | A | * | 1/1977 | Robinson | H01G 4/40 361/275.3 |
| 4,345,298 | A | * | 8/1982 | Grahame | H01G 4/221 29/25.42 |

(Continued)

FOREIGN PATENT DOCUMENTS

| | | | |
|---|---|---|---|
| KR | 102063782 B1 | 1/2020 | |
| KR | 102161768 B1 * | 9/2020 | .............. H01G 2/08 |

(Continued)

*Primary Examiner* — Timothy J. Dole
*Assistant Examiner* — Esther N Lian
(74) *Attorney, Agent, or Firm* — CANTOR COLBURN LLP

(57) ABSTRACT

Provided is a capacitor having a high withstand voltage electrode structure, for an electric vehicle (EV), the capacitor including a winding body wound as an inner winding, a first intermediate winding, a second intermediate winding, and an outer winding, a first metal electrode layer arranged on one side of the winding body, and a second metal electrode layer arranged on the other side of the winding body, wherein the second intermediate winding is formed by winding a dielectric film around the outer circumferential surface of the first intermediate winding, the dielectric film having a pair of arc shield metal patterns formed to be spaced apart from each other on the surface of the second intermediate winding and one arc shield metal pattern being connected to the first metal electrode layer and the other arc shield metal pattern being connected to the second metal electrode layer.

6 Claims, 8 Drawing Sheets

(56)          References Cited

U.S. PATENT DOCUMENTS

| | | | | |
|---|---|---|---|---|
| 4,363,162 | A * | 12/1982 | Price | H01G 4/32 |
| | | | | 29/25.42 |
| 6,631,068 | B1 * | 10/2003 | Lobo | H01G 4/015 |
| | | | | 361/303 |
| 7,008,838 | B1 * | 3/2006 | Hosking | H01G 4/012 |
| | | | | 438/239 |
| 7,923,641 | B2 * | 4/2011 | Smith | H01B 11/1008 |
| | | | | 174/113 R |
| 10,943,737 | B2 * | 3/2021 | Matsuoka | H01G 4/015 |
| 2010/0315761 | A1 * | 12/2010 | Georgopoulos | H01G 4/32 |
| | | | | 361/327 |
| 2012/0075769 | A1 * | 3/2012 | Lobo | H01G 4/008 |
| | | | | 361/301.5 |
| 2018/0122579 | A1 * | 5/2018 | Liu | H01G 9/145 |

FOREIGN PATENT DOCUMENTS

| | | | | | |
|---|---|---|---|---|---|
| KR | 20220109145 | A | * | 8/2022 | H01G 4/258 |
| KR | 20230057764 | A | * | 5/2023 | H01G 2/16 |

* cited by examiner

CAPACITOR HAVING ELECTRODE STRUCTURE OF HIGH VOLTAGE RESISTANCE FOR ELECTRIC VEHICLES

TECHNICAL FIELD

The present invention relates to a capacitor having a high withstand voltage electrode structure, for an electric vehicle (EV). In particular, the present invention relates to a capacitor having a high withstand voltage electrode structure, for an EV, wherein, when a surface arc-over occurs due to a strong electric field by winding an arc shield pattern film on a winding body, external connection electrode layers formed on one side and the other side of the winding body are electrically connected to each other to prevent an insulation from being destroyed, and an electric field is uniformized, thereby improving a breakdown voltage to be applied to an EV power conversion device.

BACKGROUND ART

Film capacitors are manufactured using an electrode forming film having a self-healing characteristic. The self-healing characteristic protects a film capacitor by heating and evaporating a metal pattern deposited at a place where a dielectric breakdown occurs when the dielectric breakdown occurs in a dielectric material, and the related technology is disclosed in Korean Patent Publication No. 10-2063782 (Patent Document 1).

The film capacitor in Patent Document 1 includes: a winding body formed by winding a first dielectric film and a second dielectric film on a core while arranging so as to overlap each other; and terminals formed at one end and the other end of the winding body, respectively, each terminal including a metal spray deposition layer and an interface layer.

The winding body is formed by winding the first dielectric film and the second dielectric film on the core in a state in which the first dielectric film and the second dielectric film are arranged so as to overlap each other. The first dielectric film and the second dielectric film each include a heavy edge, a plurality of split electrode patterns, and a plurality of fuses on a surface thereof.

The heavy edge is formed on the surface of the first dielectric film or the second dielectric film in the longitudinal direction of the first dielectric film or the second dielectric film. The plurality of split electrode patterns are respectively split on one side and the other side of the heavy edge in the longitudinal direction and formed on the surface of the first dielectric film or the second dielectric film. The plurality of fuses are formed on the surface of the first dielectric film or the second dielectric film to electrically connect between the heavy edge and each of the split electrode patterns or between the adjacent patterns among the plurality of split electrode patterns, respectively.

The metal spray deposition layer is formed at one end or the other end of the winding body using a metal spray method, and the interface layer is formed between one end or the other end of the winding body and the metal spray deposition layer, and thus, it is possible to prevent the product reliability of the film capacitor from deteriorating by causing thermal shock and mechanical deformation in the dielectric film.

In the conventional film capacitor disclosed in Patent Document 1, a rear winding wound with an insulating film is formed on the outside of the winding body, and metal spray deposition layers are formed on one side and the other side of the winding body, respectively. The rear winding is provided to improve insulation and moisture resistance characteristics of the film capacitor, and the metal spray deposition layers are used as external connection electrode layers to connect the external terminal of the film capacitor. The distance between the external connection electrode layers formed on one side and the other side of the winding body narrows when moisture or conductive pollutants contained in the air adhere to the surface of the film capacitor.

In conventional film capacitors disclosed in Patent Document 1, surface arc-over may occur due to a strong electric field caused by a high voltage, even if the rear winding includes an insulating film outside the winding body when the distance between the external connection electrode layers narrows, and This surface arc-over phenomenon has a problem in that electrode layers formed on one side and the other side of the winding body are connected to each other to destroy insulation.

CONVENTIONAL ART DOCUMENT

Patent Document (Patent Document 1): Korean Patent No. 10-2063782

SUMMARY OF THE INVENTION

Technical Problem

In order to solve the problem described above, it is an object of the present invention to provide a capacitor having a high withstand voltage electrode structure, for an electric vehicle (EV), wherein, when a surface arc-over occurs due to a strong electric field by winding an arc shield pattern film on a winding body, external connection electrode layers formed on one side and the other side of the winding body are electrically connected to each other to prevent an insulation from being destroyed, and an electric field is uniformized, thereby improving a breakdown voltage to be applied to an EV power conversion device.

Technical Solution

According to an aspect of the present invention, there is provided a capacitor having a high withstand voltage electrode structure, for an electric vehicle (EV), the capacitor including a winding body wound as an inner winding, a first intermediate winding, a second intermediate winding, and an outer winding, a first metal electrode layer arranged on one side of the winding body, and a second metal electrode layer arranged on the other side of the winding body, wherein the inner winding includes a plurality of metallization films each having a heavy edge electrode formed on a surface thereof, the heavy edge electrode of one of the plurality of metallization films is arranged to be connected to the first metal electrode layer, and the heavy edge electrode of the other one of the plurality of metallization films is arranged to be connected to the second metal electrode layer and then wound, the first intermediate winding is formed by winding an insulating film around the outer circumferential surface of the inner winding, the second intermediate winding is formed by winding a dielectric film around the outer circumferential surface of the first intermediate winding, the dielectric film having a pair of arc shield metal patterns formed to be spaced apart from each other on the surface of the second intermediate winding and one arc shield metal pattern being connected to the first metal electrode layer and the other arc shield metal pattern being connected to the second metal electrode layer, and the outer winding is formed by winding an insulating film around the outer circumferential surface of the second intermediate winding.

Advantageous Effects

In a capacitor having a high withstand voltage electrode structure, for an electric vehicle (EV), according to an aspect of the present invention, when a surface arc-over occurs due to a strong electric field by winding an arc shield pattern film on a winding body, external connection electrode layers formed on one side and the other side of the winding body are electrically connected to each other to prevent an insulation from being destroyed, and an electric field is uniformized, thereby improving a breakdown voltage to be applied to an EV power conversion device.

DETAILED DESCRIPTION OF THE INVENTION

Hereinafter, an embodiment of a capacitor for an EV having a high withstand voltage electrode structure of the present invention will be described with reference to the accompanying drawings.

Figure 1:
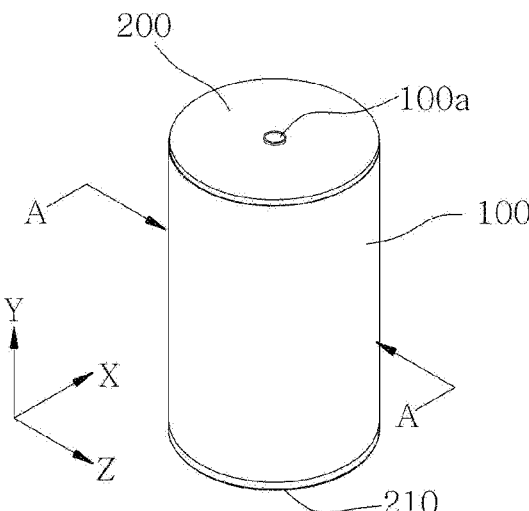
FIG. 1 is a perspective view illustrating a capacitor having a high withstand voltage electrode structure, for an electric vehicle (EV), according to an aspect of the present invention.
Figure 2:
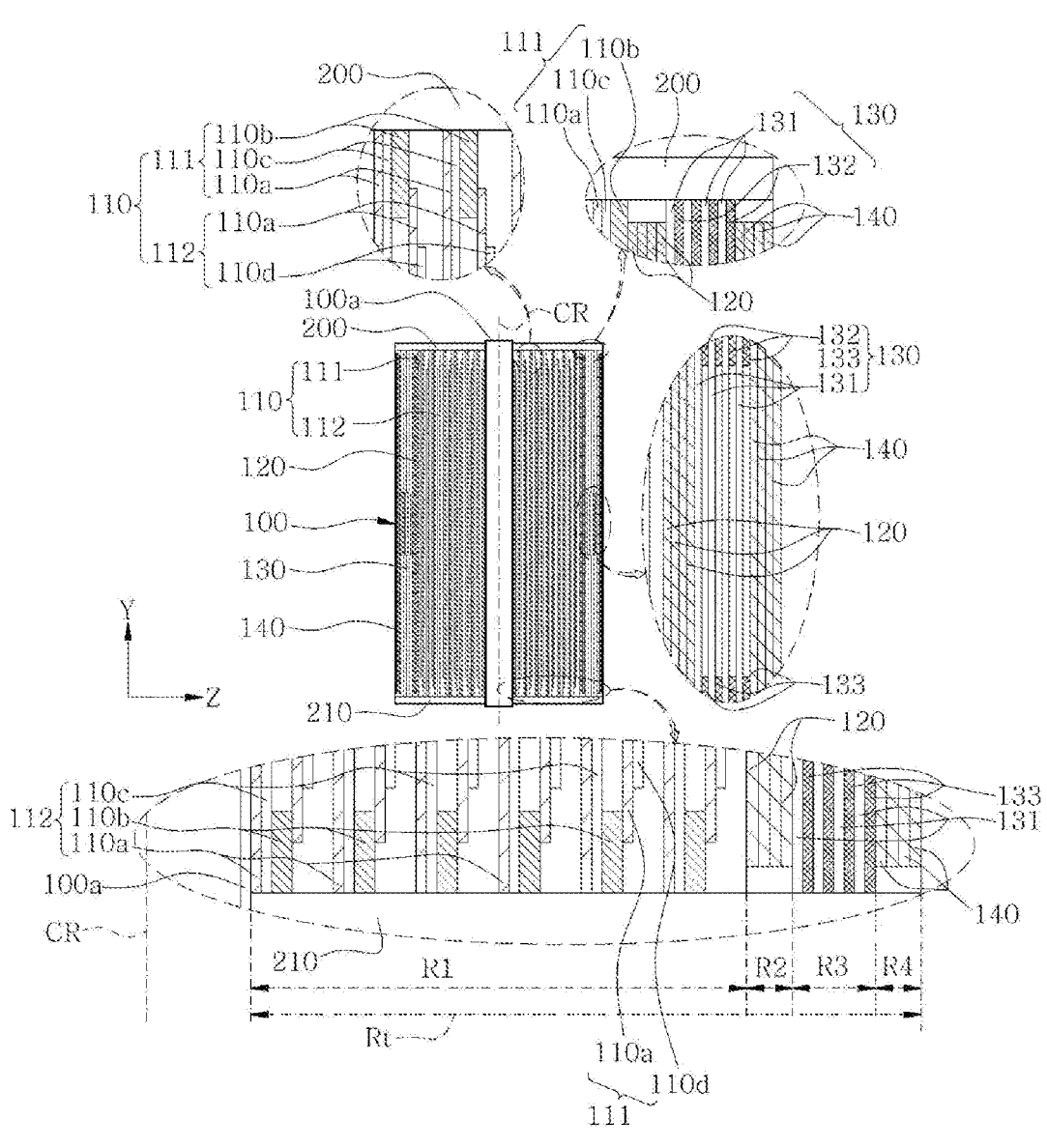
FIG. 2 is a cross-sectional view taken along line A-A of an capacitor for an EV with a high withstand voltage electrode structure shown in FIG. 1.
Figure 3:
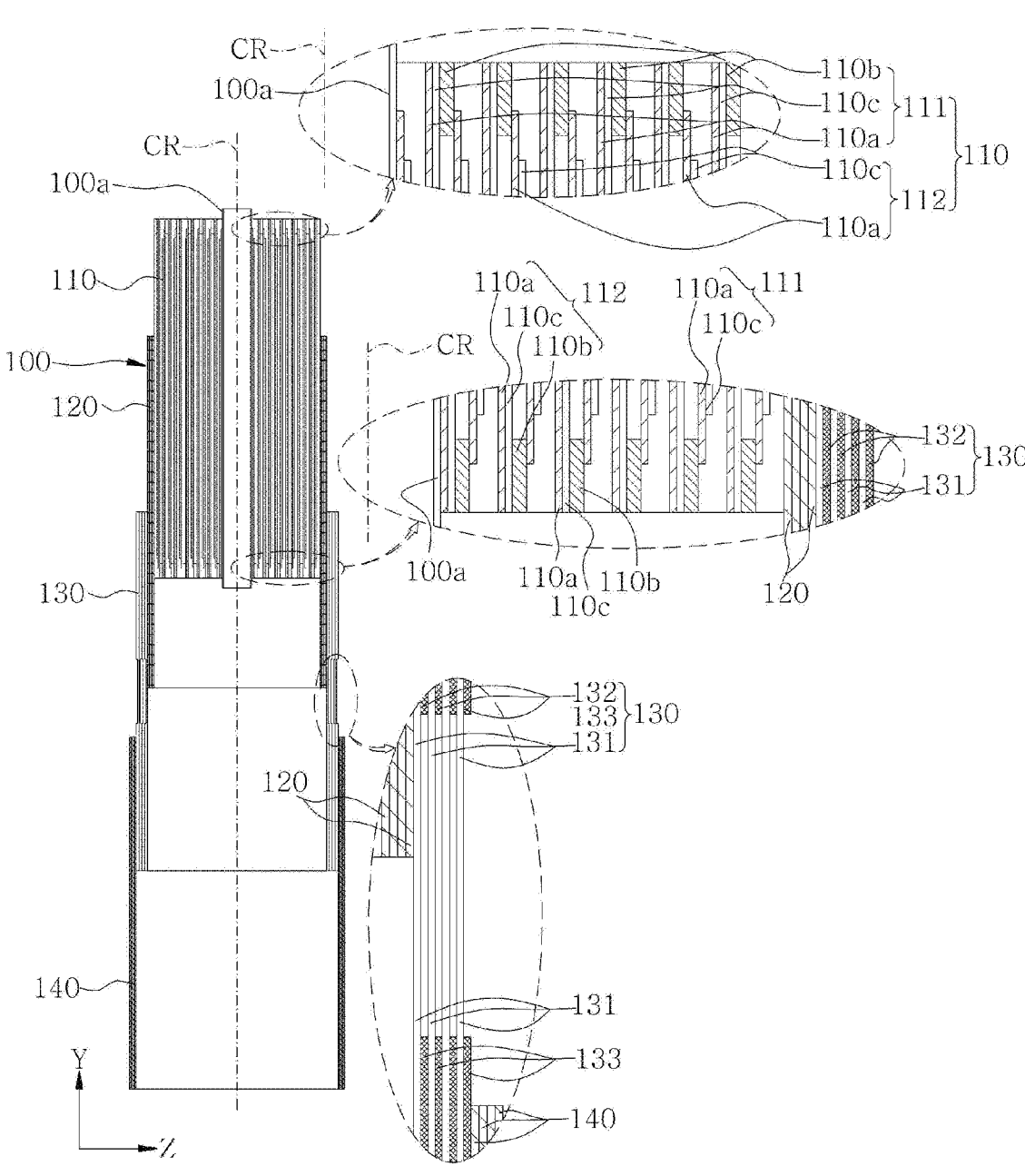
FIG. 3 is a partially exploded assembly cross-sectional view of a winding body shown in FIG. 2.

As shown in FIGS. 1 to 3, a capacitor for an EV having a high withstand voltage electrode structure according to an embodiment of the present invention includes a winding body 100, a first metal electrode layer 200, and a second metal electrode layer 210.

The winding body 100 is formed by winding an inner winding 110, a first intermediate winding 120, a second intermediate winding 130, and an outer winding 140. The inner winding 110 of the winding body 100 includes a plurality of metallization films 111 and 112 each having a heavy edge electrode 110*b* formed on a surface thereof. The heavy edge electrode 110*b* of one metallization film 111 of the plurality of metallization films 111 and 112 is connected to the first metal electrode layer 200, and the heavy edge electrode 110*b* of the other metallization film 112 is connected to the second metal electrode layer 210 and then wound.

The first intermediate winding 120 is formed by winding the insulating film so as to surround the outer circumferential surface of the inner winding 110, and the second intermediate winding 130 is formed by winding a dielectric film 131 around the outer circumferential surface of the first intermediate winding 120, the dielectric film 131 having a pair of arc shield metal patterns formed to be spaced apart from each other on the surface of the second intermediate winding 130 and one arc shield metal pattern being connected to the first metal electrode layer 200 and the other arc shield metal pattern being connected to the second metal electrode layer 210. The outer winding 140 is formed by winding an insulating film to surround the outer circumferential surface of the second intermediate winding 130.

The first metal electrode layer 200 is arranged on one side of the winding body 100, and the second metal electrode layer 210 is arranged on the other side of the winding body 100.

An embodiment of a capacitor for an EV having a high withstand voltage electrode structure according to the present invention is described below in more detail.

Figure 4:
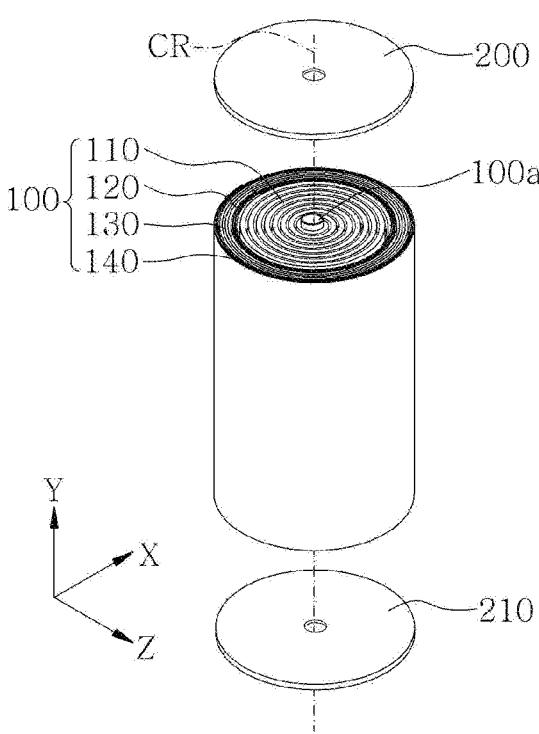
FIG. 4 is a partially exploded perspective view of a capacitor for an EV having a high withstand voltage electrode structure shown in FIG. 1.

As shown in FIGS. 2 to 4, the winding body 100 is formed by winding the first intermediate winding 120 on the outer circumferential surface of the inner winding 110, winding the second intermediate winding 130 on the outer circumferential surface of the first intermediate winding 120, and winding the outer winding 140 on the outer circumferential surface of the second intermediate winding 130, such that the second intermediate winding 130 is inserted inside the outer winding 140, the first intermediate winding 120 is inserted inside the second intermediate winding 130, and the inner winding 110 is inserted inside the first intermediate winding 120.

The inner winding 110 of the winding body 100 determines the capacitance of the capacitor for an EV having the high withstand voltage electrode structure of the present embodiment and is formed by winding, around an insulating hollow bobbin 100*a*, the plurality of metallization films 111 and 112 each having the heavy edge electrode 110*b* formed on the surface thereof. The heavy edge electrode 110*b* of one metallization film 111 of the plurality of metallization films 111 and 112 is connected to the first metal electrode layer 200, and the heavy edge electrode 110*b* of the other metallization film 112 is connected to the second metal electrode layer 210 and then wound around the insulating hollow bobbin 100*a*.

Figure 5:
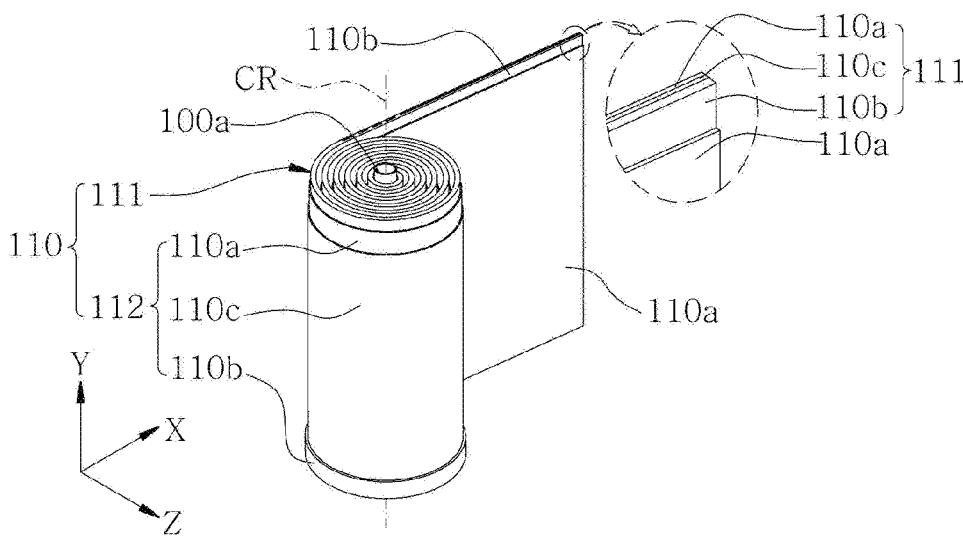
FIG. 5 is an enlarged perspective view of the inner winding shown in FIG. 4.
Figure 6:
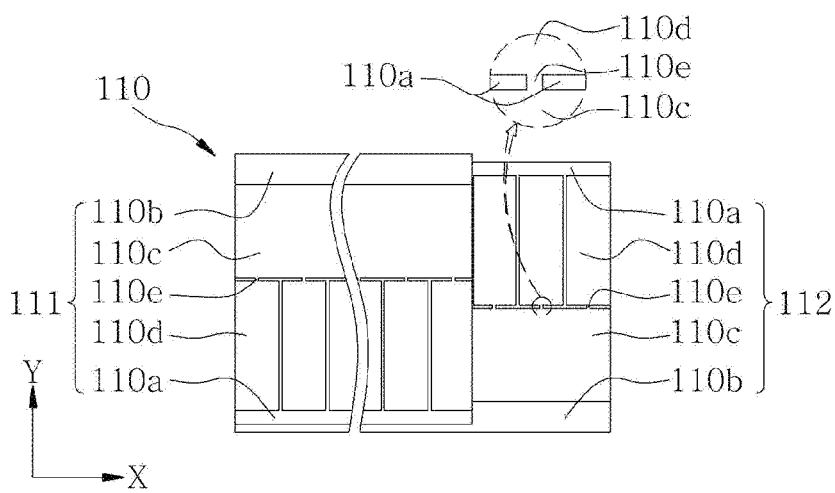
FIG. 6 is a development view of the inner winding shown in FIG. 5.

As shown in FIGS. 2, 5 and 6, the specific embodiment of the inner winding 110 includes the plurality of metallization films 111 and 112, and the plurality of metallization films 111 and 112 include the first metallization film 111 and the second metallization film 112.

In the first metallization film 111, the heavy edge electrode 110*b* connected to the first metal electrode layer 200 is formed in the longitudinal direction X on one side in the width direction Y, and in the second metallization film 112, the heavy edge electrode 110*b* connected to the second metal electrode layer 210 is formed in the longitudinal direction X on the other side in the width direction Y.

Each of the first metallization film 111 and the second metallization film 112 includes a dielectric film 110*a*, a heavy edge electrode 110b, a common electrode 110c, a plurality of split electrodes 110d, and a plurality of fuses 110e, as shown in the development view of the inner winding 110 shown in FIG. 6.

The dielectric film 110a is formed in a sheet shape using the same material as the dielectric film 131 of the second intermediate winding 130. Specifically, a material of the dielectric film 110a includes one of polypropylene, polyethylene terephthalate polyester (PETP), polyphenylene sulfide (PPS), polyethylene naphthalate (PEN), polyether imide (PEI), and polycarbonate (PC).

The heavy edge electrode 110b is aligned and formed at an end of one side or the other side of the dielectric film 110a in the width direction Y and is connected to the first metal electrode layer 200 or the second metal electrode layer 210. The common electrode 110c is aligned at an end of one side or the other side of the dielectric film 110a in the width direction Y and is formed on the surface of the dielectric film 110a to be positioned between the dielectric film 110a and the heavy edge electrode 110b.

Each of the plurality of split electrodes 110d is spaced apart from the common electrode 110c and is arranged and formed on the surface of the dielectric film 110a, and each of the plurality of fuses 110e is formed between the common electrode 110c and the split electrodes 110d to connect the common electrode 110c with the split electrodes 110d. Each of the plurality of fuses 110e are also formed between one split electrode 110d and another split electrode 110d, although not shown in the drawing, to connect the one split electrode 110d with the other split electrode 110d.

Figure 7:
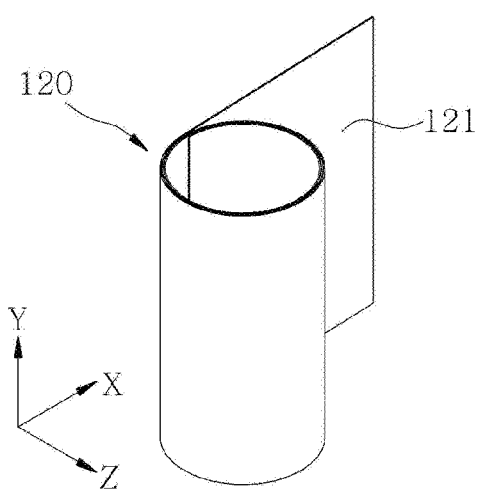
FIG. 7 is an enlarged perspective view of the first intermediate winding shown in FIG. 4.

The first intermediate winding 120 is formed by winding the insulating film 121 around the outer circumferential surface of the inner winding 110, as shown in FIGS. 3, 4, and 7. For example, the first intermediate winding 120 is formed by winding an insulating film to surround the outer circumferential surface of the inner winding 110 so as to be located between the inner winding 110 and the second intermediate winding 130 to insulate between the inner winding 110 and the second intermediate winding 130.

The insulating film 121 of the first intermediate winding 120 is formed in a sheet shape using the same material as the insulating film 141 of the outer winding 140. Specifically, a material of the insulating film 121 includes one of polypropylene, PETP, PPS, PEN, PEI, and PC.

Figure 8:
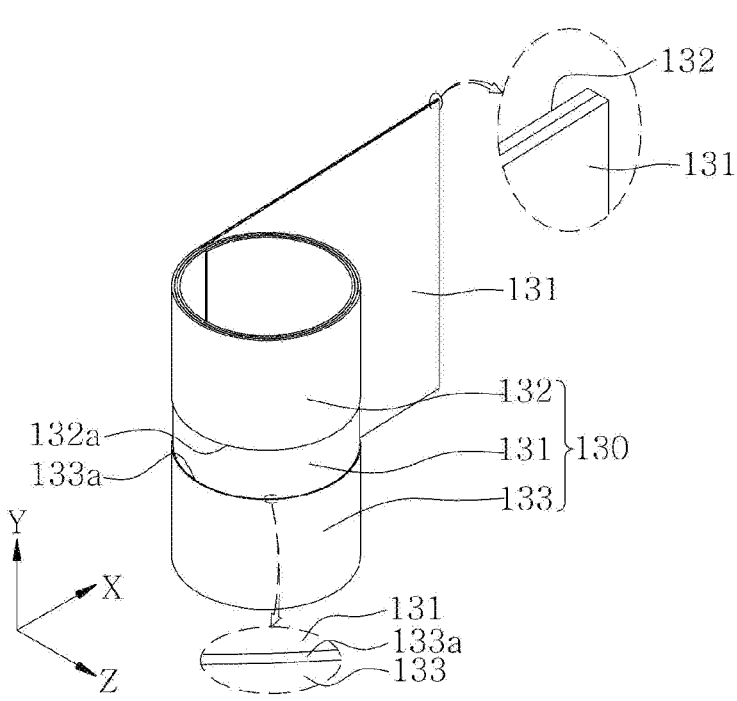
FIG. 8 is an enlarged perspective view according to an example of the second intermediate winding illustrated in FIG. 4.

As shown in FIGS. 2, 3, and 8, the second intermediate winding 130 surrounds the outer circumferential surface of the first metal electrode layer 120 and the outer circumferential surface of the second intermediate winding 130 is surrounded by the outer winding 140. The second intermediate winding 130 is positioned between the first intermediate winding 120 and the outer winding 140. The second intermediate winding 130 is formed by winding the dielectric film 131 so as to surround the outer circumferential surface of the first intermediate winding 120. The dielectric film 131 includes a pair of arc shield metal patterns 132 and 133 formed on the surface thereof to be spaced apart from each other, one arc shield metal pattern being connected to the first metal electrode layer 200 and the other being connected to the second metal electrode layer 210.

Figure 9:
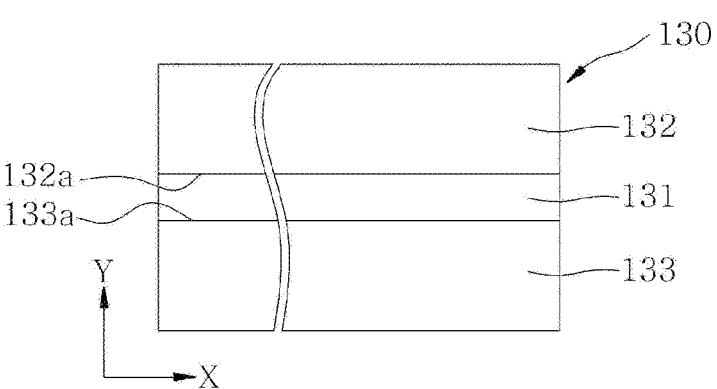
FIG. 9 is a development view of the second intermediate winding shown in FIG. 8.

The second intermediate winding 130 includes the dielectric film 131 and the pair of arc shield metal patterns 132 and 133, as shown in FIGS. 8 and 9.

The dielectric film 131 is formed in a sheet shape using the same material as the dielectric film 110a of the inner winding 110. Specifically, a material of the insulating film 131 of the second intermediate winding 130 includes one of polypropylene, PETP, PPS, PEN, PEI, and PC.

Each of the pair of arc shield metal patterns 132 and 133 is aligned with one end and the other end in the width direction Y of the dielectric film 131 and is formed on the surface of the dielectric film 131 to be spaced apart from each other. One is connected to the first metal electrode layer 200 and the other is connected to the second metal electrode layer 210. When a surface arc-over is caused by a strong electric field in the capacitor for an EV having a high withstand voltage electrode structure of the present embodiment, the external connection electrode layers (not shown) formed on one side and the other side of the winding body 100, that is, the first metal electrode layer 200 and the second metal electrode layer 210 are electrically connected to each other to shield the surface arc-over to prevent the insulation from being destroyed.

The pair of arc shield metal patterns 132 and 133 include a first arc shield metal pattern 132 and a second arc shield metal pattern 133.

The first arc shield metal pattern 132 of the pair of arc shield metal patterns 132 and 133 is formed on the surface of the dielectric film 131 so as to be aligned at the end of one side in the width direction Y of the dielectric film 131, and the second arc shield metal pattern 133 is aligned at the end of the other side of the dielectric film 131 in the width direction Y to be formed on the surface of the dielectric film 131 so as to be spaced apart from the first arc shield metal pattern 132 and connected to the second metal electrode layer 210.

Figure 10:
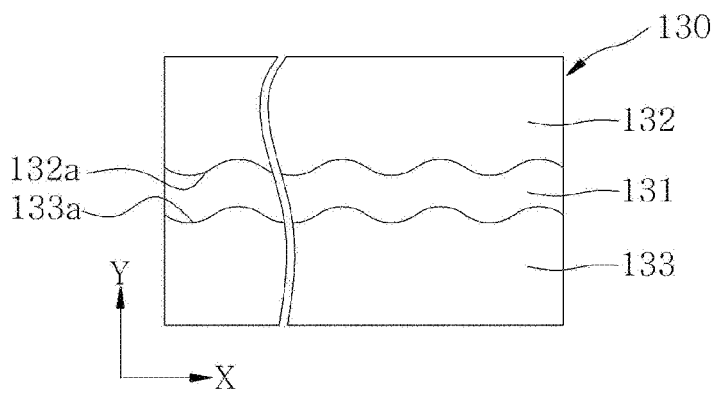
FIG. 10 is a development view according to another example of the second intermediate winding shown in FIG. 8.

Each of the first arc shield metal pattern 132 and the second arc shield metal pattern 133 includes surfaces 132a and 133a facing each other as shown in FIGS. 8 to 10, which are formed in a flat surface or a curved surface. For example, as shown in FIGS. 8 and 9, the first arc shield metal pattern 132 and the second arc shield metal pattern 133 are formed in a rectangular sheet shape using a metal material, and the surfaces 132a and 133a facing each other are formed in a plane. Each of the first arc shield metal pattern 132 and the second arc shield metal pattern 133 is formed in a sheet shape using a metal material, and surfaces 132a and 133a facing each other are formed in curved surfaces, as shown in FIG. 10.

Figure 11:
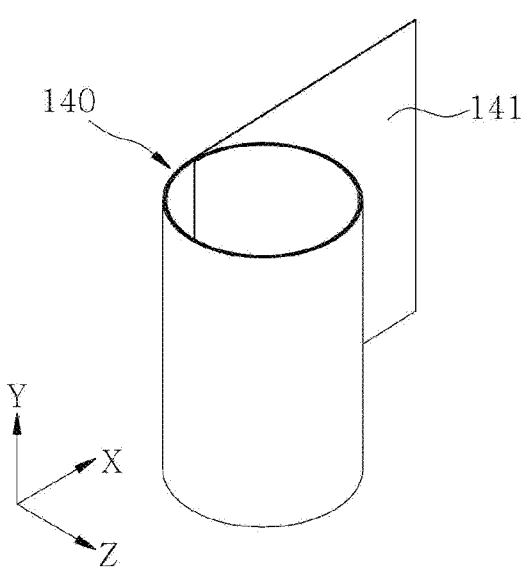
FIG. 11 is an enlarged perspective view of the outer winding shown in FIG. 4.

As shown in FIGS. 3, 4, and 11, the outer winding 140 is formed by winding the insulating film 141 to surround the outer circumferential surface of the second intermediate winding 130 so that the outer winding 140 is located outside the second intermediate winding 130 to cover the outer circumferential surface of the second intermediate winding 130.

The insulating film 141 of the outer winding 140 is formed in a sheet shape using the same material as the insulating film 121 of the first intermediate winding 120. Specifically, a material of the insulating film 141 of the outer winding 140 includes one of polypropylene, PETP, PPS, PEN, PEI, and PC.

As shown in FIGS. 2 and 4, the first metal electrode layer 200 is formed in a disk shape of a metal material such as Cu, Ni, and Al on one side of the winding body 100 in the width direction Y, using a metal spray method, to thus be connected to the heavy edge electrode 110b of the first metallization film 111 in the inner winding 110 and the first arc shield metal pattern 132 of the second intermediate winding 130. For example, the first metal electrode layer 200 is formed using a metal spray method so as to be electrically connected to one side of the heavy edge electrode 110b of the first metalized film 111 and one side of the first arc shield metal pattern 132 of the second intermediate winding 130 for electrical conduction.

As shown in FIGS. 2 and 4, the second metal electrode layer 210 is formed to face the first metal electrode layer 200 in a disk shape of a metal material such as Cu, Ni, and Al on the other side of the winding body 100 in the width direction Y, using a metal spray method, to thus be connected to the heavy edge electrode 110*b* of the second metallization film 112 in the inner winding 110 and the second arc shield metal pattern 133 of the second intermediate winding 130. For example, the second metal electrode layer 210 is formed using a metal spray method so as to be electrically connected to the other side of the heavy edge electrode 110*b* of the second metalized film 112 and the other side of the second arc shield metal pattern 133 of the second intermediate winding 130 for electrical conduction.

The winding body 100 connected to the first metal electrode layer 200 and the second metal electrode layer 210 on one side and the other side thereof, respectively, is formed to have a thickness Rt as shown in FIG. 2. The thickness Rt of the winding body 100 is set in the direction Z.

When the thickness of the winding body 100 is Rt, the thickness R1 of the inner winding 110 is formed to be about 85% to about 95% of the thickness Rt of the winding body 100, and the thickness R2 of the first intermediate winding 120 is formed to be about 1% to about 3% of the thickness Rt of the winding body 100. The thickness R3 of the second intermediate winding 130 is formed to be about 3% to about 9% of the thickness Rt of the winding body 100, and the thickness R4 of the outer winding 140 is formed to be about 1% to about 3% of the thickness Rt of the winding body 100.

When the thickness of the winding body 100 is Rt, each of the thicknesses R1, R2, R3, and R4 of the inner winding 110, the first intermediate winding 120, the second intermediate winding 130, and the outer winding 140 is set as described above, so that the surface arc-over phenomenon caused by a strong electric field may be sufficiently shielded while sufficiently securing the capacitance of the capacitor for an EV having the high withstand voltage electrode structure of the present embodiment. The inner winding 110, the first intermediate winding 120, the second intermediate winding 130, and the outer winding 140 of the capacitor for an EV having the high withstand voltage electrode structure of the present embodiment are each wound in a cylindrical shape, so that the capacitor for an EV having the high withstand voltage electrode structure of the present embodiment is formed as a cylindrical film capacitor.

For the electrical test of the capacitor for an EV having the high withstand voltage electrode structure of the present embodiment described above, cylindrical film capacitors according to Comparative Examples and Experimental Examples have been manufactured.

The winding body 100 of the cylindrical film capacitor according to a comparative example is formed by winding an outer winding 140 to surround the outer circumferential surface of the inner winding 110 after winding the inner winding 110 on the insulating hollow bobbin 100*a*, such as a known cylindrical film capacitor. That is, the winding body 100 of the cylindrical film capacitor includes the inner winding 110 and the outer winding 140. The thickness R1 of the inner winding 110 is formed to be about 90% of the thickness Rt of the winding body 100. The thickness R4 of the outer winding 140 is formed to be about 10% of the thickness Rt of the winding body 100. The cylindrical film capacitor has been manufactured such that, as electrical characteristics, a rated voltage of 3500 V is applied, a rated capacity becomes 5 μF, and a rated current is 50 A.

After forming the winding body 100 of the cylindrical film capacitor according to the comparative example, the first metal electrode layer 200 and the second metal electrode layer 210 are formed on one side and the other side of the winding body 100, respectively, using a metal spray method. Then, the first metal electrode layer 200 and the second metal electrode layer 210 are assembled by using a case (not shown) to manufacture twenty cylindrical film capacitors according to the comparative example by using a known method.

As described above, the winding body 100 of the cylindrical film capacitor according to the experimental example has been formed in a manner in which, after winding the inner winding 110 on the insulating hollow bobbin 100*a*, the first intermediate winding 120 was formed to surround the outer circumferential surface of the inner winding 110, the second intermediate winding 130 was wound on the outer circumferential surface of the first intermediate winding 120 and then the outer winding 140 was formed on the outer circumferential surface of the first intermediate winding 120.

The thickness R1 of the inner winding 110 of the cylindrical film capacitor according to the experimental example was formed to be about 90% of the thickness Rt of the winding body 100 based on the center of the winding body 100, and the thickness R2 of the first intermediate winding body 120 was formed to be about 1% of the thickness Rt of the winding body 100. The thickness R3 of the second intermediate winding 130 was formed to be about 3% of the thickness Rt of the winding body 100, and the thickness R4 of the outer winding 140 was formed to be about 1% of the thickness Rt of the winding body 100. Like the comparative example, the cylindrical film capacitor has been manufactured such that, as electrical characteristics, a rated voltage of 3500 V is applied, a rated capacity becomes 5 μF, and a rated current is 50 A.

After forming the winding body 100 of the cylindrical film capacitor according to the experimental example, the first metal electrode layer 200 and the second metal electrode layer 210 are formed on one side and the other side of the winding body 100, respectively, using a metal spray method. Then, like the comparative example, the first metal electrode layer 200 and the second metal electrode layer 210 are assembled by using a case (not shown) to manufacture twenty cylindrical film capacitors according to the comparative example by using a known method.

As the electrical characteristics of cylindrical film capacitors according to comparative and experimental examples, breakdown voltage (BVD) characteristics were measured using BVD measuring equipment (not shown). That is, the electrical characteristics of the cylindrical film capacitors according to the comparative and experimental examples were determined as "OK" when the BVD was more than seven times the rated voltage after applying, to the cylindrical film capacitors, a voltage of several to several tens of times higher than the rated voltage of the cylindrical film capacitor according to the comparative and experimental examples using the BVD measuring equipment.

In the cylindrical film capacitor according to the comparative example, five of 20 cylindrical film capacitors are determined as "OK", whereas, in the cylindrical film capacitor according to the experimental example, 18 of 20 cylindrical film capacitors were determined to be "OK". It was determined that the pair of arc shield metal patterns 132 and 133 of the second intermediate winding 130 applied to the cylindrical film capacitor according to the experimental example shielded the surface arc-over phenomenon caused by the strong electric field generated by the high voltage.

As described above, the capacitor for EV having the high withstand voltage electrode structure of this invention is formed by winding the arc shield pattern films on the winding body and shields a surface arc-over phenomenon even when the surface arc-over phenomenon occurs due to a strong electric field. Accordingly, the external connection electrode layers formed on one side and the other side of the winding body are electrically connected to each other to prevent dielectric breakdown and uniformize the electric field to improve dielectric breakdown voltage to then be applied to an EV power conversion device (not shown).

INDUSTRIAL APPLICABILITY

The capacitor for an EV having a high withstand voltage electrode structure of the present invention is applied to a capacitor manufacturing industry.

EXPLANATION OF REFERENCE NUMERALS

100: Winding body, 110: Inner winding
110*a*: Dielectric film, 110*b*: heavy edge electrode
110*c*: Common electrode, 110*d*: Split electrode
110*e*: Fuses, 111: First metallization film
112: Second metallization film, 120: First intermediate winding
130: Second intermediate winding, 131: Dielectric film
132: First arc shield metal pattern, 133: Second arc shield metal pattern
140: Outer winding, 200: First metal electrode layer
210: Second metal electrode layer

The invention claimed is:

1. A capacitor having a high withstand voltage electrode structure for an electric vehicle, the capacitor comprising:
   a winding body wound as an inner winding, a first intermediate winding, a second intermediate winding, and an outer winding;
   a first metal electrode layer arranged on one side of the winding body; and
   a second metal electrode layer arranged on the other side of the winding body,
   wherein the inner winding includes a plurality of metallization films each having a heavy edge electrode formed on a surface thereof, the heavy edge electrode of one of the plurality of metallization films is arranged to be connected to the first metal electrode layer, and the heavy edge electrode of the other one of the plurality of metallization films is arranged to be connected to the second metal electrode layer and then wound,
   the first intermediate winding is formed around an outer circumferential surface of the inner winding,
   the second intermediate winding is formed around an outer circumferential surface of the first intermediate winding, the second intermediate winding including: a first dielectric film; and a first arc shield metal pattern and a second arc shield metal pattern formed on a surface of the first dielectric film to be spaced apart from each other, wherein the first arc shield metal pattern is aligned with an end of one side in the width direction of the first dielectric film and connected to the first metal electrode layer, and the second arc shield metal pattern is aligned with an end of the other side of the first dielectric film in the width direction of the first dielectric film to be spaced apart from the first arc shield metal pattern and connected to the second metal electrode layer, and the outer winding is formed by winding an insulating film around the outer circumferential surface of the second intermediate winding.

2. The capacitor of claim 1, wherein the plurality of metallization films in the inner winding comprise:
   a first metallization film in which the heavy edge electrode connected to the first metal electrode layer is formed in the length direction on one side in the width direction; and
   a second metallization film in which the heavy edge electrode connected to the second metal electrode layer is formed in the length direction on the other side in the width direction.

3. The capacitor of claim 2, wherein each of the first metallization film and the second metallization film comprises:
   a second dielectric film;
   a heavy edge electrode which is arranged on one side or the other side of the second dielectric film in the width direction and is connected to the first metal electrode layer or the second metal electrode layer;
   a common electrode arranged on one side or the other side of the second dielectric film in the width direction and formed on the surface of the second dielectric film;
   a plurality of split electrodes spaced apart from the common electrode and formed on the surface of the second dielectric film; and
   a plurality of fuses formed between the common electrode and the split electrodes, respectively, to connect the common electrode with the split electrodes, wherein
   the second dielectric film included in each of the first metallization film and the second metallization film includes the same material as the first dielectric film in the second intermediate winding, and
   a material of the second dielectric film includes one of polypropylene, polyethylene terephthalate polyester (PETP), polyphenylene sulfide (PPS), polyethylene naphthalate (PEN), polyether imide (PEI), and polycarbonate (PC).

4. The capacitor-fer-an-EV of claim 1, wherein
   the first intermediate winding is formed by winding an insulating film around the outer circumferential surface of the inner winding so as to be positioned between the inner winding and the second intermediate winding, to thereby insulate between the inner winding and the second intermediate winding,
   the second intermediate winding surrounds the outer circumferential surface of the first intermediate winding and is positioned between the first intermediate winding and the outer winding so that the outer circumferential surface thereof is surrounded by the outer winding,
   the outer winding is formed by winding an insulating film around the outer circumferential surface of the second intermediate winding so as to be positioned outside the second intermediate winding, and
   each of the insulating film of the first intermediate winding and the insulating film of the outer winding includes one of polypropylene, polyethylene terephthalate polyester (PETP), polyphenylene sulfide (PPS), polyethylene naphthalate (PEN), polyether imide (PEI), and polycarbonate (PC).

5. The capacitor of claim 1, wherein each of the first arc shield metal pattern and the second arc shield metal pattern comprises surfaces facing each other, which are formed in a plane or a curved surface.

6. The capacitor of claim 1, wherein the thickness of the inner winding is about 85% to about 95% of the thickness of the winding body with respect to the center of the winding body, the thickness of the first intermediate winding is about 1% to about 3% of the thickness of the winding body, the thickness of the second intermediate winding is about 3% to about 9% of the thickness of the winding body, and the thickness of the outer winding is about 1% to about 3% of the thickness of the winding body.

\* \* \* \* \*